(12) United States Patent
Goedel

(10) Patent No.: US 8,128,838 B2
(45) Date of Patent: Mar. 6, 2012

(54) PHOSPHORESCENT MARINE PRODUCTS

(75) Inventor: John R. Goedel, Eden Prairie, MN (US)

(73) Assignee: GloTek Corp., Maple Grove, MN (US)

( * ) Notice: Subject to any disclaimer, the term of this patent is extended or adjusted under 35 U.S.C. 154(b) by 215 days.

(21) Appl. No.: 12/069,028

(22) Filed: Feb. 6, 2008

(65) Prior Publication Data
US 2009/0261295 A1    Oct. 22, 2009

Related U.S. Application Data

(63) Continuation of application No. 11/470,944, filed on Sep. 7, 2006, now abandoned, which is a continuation of application No. 11/316,797, filed on Dec. 22, 2005, now abandoned, which is a continuation of application No. 10/791,363, filed on Mar. 1, 2004, now abandoned, which is a continuation of application No. 09/778,973, filed on Feb. 6, 2001, now abandoned, which is a continuation of application No. 09/152,377, filed on Sep. 14, 1998, now Pat. No. 6,253,698.

(51) Int. Cl.
*E04H 12/00* (2006.01)

(52) U.S. Cl. ..................... 252/301.36; 52/301

(58) Field of Classification Search ........... 252/301.4 R, 252/301.36; 428/690; 441/13, 36, 89; 114/343, 114/89, 90, 382, 102.1, 202.1, 258, 263, 114/44–49, 361, 345, 364, 219, 220, 381, 114/230.1–230.3; 14/76; 405/1, 4, 7, 212–216, 405/218–221; 52/301; 116/26, 202, 227, 116/228, 173, 174
See application file for complete search history.

(56) References Cited

U.S. PATENT DOCUMENTS

| | | | | |
|---|---|---|---|---|
| 2,121,052 A * | 6/1938 | Roberts et al. | ................ | 114/292 |
| 2,382,355 A * | 8/1945 | Warren, Jr. | ................. | 250/462.1 |
| 2,436,182 A * | 2/1948 | Schmidling | ................ | 250/488.1 |
| 2,875,721 A * | 3/1959 | Downey | ........................ | 114/219 |
| 3,199,138 A * | 8/1965 | Nordeen | ......................... | 15/350 |
| 3,680,851 A * | 8/1972 | Takada | .......................... | 267/140 |
| 3,848,480 A * | 11/1974 | Oseroff et al. | ............... | 74/558.5 |
| 3,928,701 A * | 12/1975 | Roehner | ....................... | 428/222 |
| 4,123,812 A * | 11/1978 | Owens | .......................... | 114/343 |
| 4,161,090 A * | 7/1979 | Watts, Jr. | ........................ | 52/301 |
| 4,211,813 A * | 7/1980 | Gravisse et al. | ................ | 442/76 |
| 4,245,931 A * | 1/1981 | Watts, Jr. | ........................ | 52/301 |
| 4,325,537 A * | 4/1982 | Winter et al. | ................ | 254/405 |

(Continued)

FOREIGN PATENT DOCUMENTS

GB         1352994         *  5/1974

*Primary Examiner* — Carol M Koslow
(74) *Attorney, Agent, or Firm* — Kagan Binder, PLLC

(57) ABSTRACT

In one embodiment of the invention, a marine article of the invention includes a phosphorescent phosphor. A particularly advantageous phosphorescent phosphor comprises $MAl_2O_4$. As used herein, "M" is at least one cation selected from a group consisting of calcium, strontium, and barium. The phosphor comprises 0.001% to 10% of a europium activator, and 0.001% to 10% of at least one dopant selected from the group consisting of lanthanum, cerium, praseodymium, neodymium, samarium, gadolinium, dysprosium, holmium, erbium, thulium, ytterbium, lutetium, tin and bismuth as a co-activator, in terms of mol % relative to the metal element expressed by M. The phosphorescent marine article has an afterglow corresponding to a luminance of at least 0.3 mCd/$m^2$ for at least 420 minutes.

4 Claims, 2 Drawing Sheets

U.S. PATENT DOCUMENTS

| | | | | |
|---|---|---|---|---|
| 4,869,011 A * | 9/1989 | Whiting et al. | ................... | 43/23 |
| 4,875,427 A * | 10/1989 | Harris, Jr. | ..................... | 114/219 |
| 4,910,280 A * | 3/1990 | Robbins, III | .................... | 428/71 |
| 5,009,133 A * | 4/1991 | Carey | ........................... | 81/180.1 |
| 5,421,287 A * | 6/1995 | Yonover | ........................ | 116/209 |
| 5,424,006 A * | 6/1995 | Murayama et al. | .... | 252/301.4 R |
| 5,475,951 A * | 12/1995 | Litzow | ............................ | 52/177 |
| 5,584,731 A * | 12/1996 | Dombrowski | .................... | 440/2 |
| 5,586,838 A * | 12/1996 | Walsh | ........................... | 405/216 |
| 5,674,437 A * | 10/1997 | Geisel | ............................ | 264/21 |
| 5,727,493 A * | 3/1998 | Pierce | .......................... | 114/219 |
| 5,775,966 A * | 7/1998 | Bautista Real et al. | ......... | 441/80 |
| 5,853,614 A * | 12/1998 | Hao et al. | ............... | 252/301.4 R |
| 5,976,411 A * | 11/1999 | Feng et al. | ............... | 252/301.35 |
| 5,992,342 A * | 11/1999 | Nordin et al. | ................. | 114/343 |
| 6,001,491 A * | 12/1999 | Bayer et al. | ..................... | 428/500 |
| 6,242,056 B1 * | 6/2001 | Spencer et al. | ............... | 427/512 |
| 6,253,698 B1 * | 7/2001 | Goedel | ......................... | 114/218 |

* cited by examiner

PHOSPHORESCENT MARINE PRODUCTS

This application is a continuation of application Ser. No. 11/470,944, filed Sep. 7, 2006, now abandoned, which is a continuation of application Ser. No. 11/316,797, filed Dec. 22, 2005, now abandoned, which is a continuation of application Ser. No. 10/791,363, filed Mar. 1, 2004, now abandoned, which is a continuation of application Ser. No. 09/778,973, filed Feb. 6, 2001, now abandoned, which is a continuation of application Ser. No. 09/152,377, filed Sep. 14, 1998, now U.S. Pat. No. 6,253,698, which are incorporated herein by reference.

BACKGROUND OF THE INVENTION

During recent years, maritime activities both commercial and recreational have increased dramatically. As a consequence, visibility of marine articles is more important as U.S. bodies of water become crowded. The current means of increasing visibility of marine articles, such as, for example, buoy markers and boat indicators, include phosphorescent or fluorescent materials and brightly colored paints. However, these current means suffer from serious visibility and durability challenges.

Generally, the afterglow time of a fluorescent substance is short, i.e., the light emitted from the fluorescent substance decays immediately after removal from the source of excitation. Unlike such a fluorescent substance, some substances emit light after having absorbed ultraviolet radiation, and afterglow thereof that can be visually observed for a considerable time (ranging from several tens of minutes to several hours) after the source of stimulus is cut off. Such substances are called phosphorescent phosphors.

Phosphorescent phosphors are known. Sulfide phosphorescent phosphors are also known and include for example CaS:Bi (which emits light of violet blue), CaStS:Bi (which emits light of blue), ZnS:Cu (which emits light of green) and ZnCdS:Cu (which emits light of green) and ZnCdS:Cu (which emits light of yellow or orange). However, many of these sulfide phosphorescent phosphors are chemically unstable and show degraded light resistance, i.e., they suffer from problems that must be solved for practical use.

The most extensively used phosphorescent phosphor among such sulfide phosphorescent phosphors is zinc sulfide phosphorescent phosphor (ZnS:Cu). However, zinc sulfide phosphorescent phosphor is decomposed as the result of irradiation by ultraviolet radiation in the presence of moisture and thus, over time, blackens or reduces the phosphor's luminance. Therefore, it is difficult to use this phosphorescent phosphor in fields where it is placed outdoors and exposed to a direct sunlight, that is, application is limited to luminous clocks/watches or clocks/watches and instrument dials, evacuation guiding signs or indoor night-time display.

Even when zinc sulfide phosphorescent phosphor is used for a luminous clock, the afterglow allows the time to be visually recognized lasts only from 30 minutes to 2 hours. Therefore, the phosphorescent phosphor must be doped with a radioactive substance and a self-luminous paint to keep emitting light by absorbing the energy of radiation from the radioactive substance.

The use of brightly-colored paints, including fluorescent paints, on marine floats do not solve the visibility problem in darkness. Brightly-colored and fluorescent paints can only be seen if light is present to be reflected thereby. Also, these paints become eroded or worn from the relatively soft and pliable surface of microporous resinous or foam marine floats, during use, so that any advantage which justifies the expense of applying such a paint is soon lost or severely diminished.

Thus, a need exists to develop phosphorescent marine products that provide long lasting afterglow characteristics, are chemically stable and physically durable in an outdoor marine environment.

SUMMARY OF THE INVENTION

The invention solves the prior art's visibility and durability problems of marine products by developing a highly visible and durable marine compatible product. In one embodiment, a marine article of the invention includes a phosphorescent phosphor. A particularly advantageous phosphorescent phosphor comprises $MAl_2O_4$. As used herein, "M" is at least one cation selected from a group consisting of calcium, strontium, and barium. The phosphor comprises 0.001% to 10% of a europium activator, and 0.001% to 10% of at least one dopant selected from the group consisting of lanthanum, cerium, praseodymium, neodymium, samarium, gadolinium, dysprosium, holmium, erbium, thulium, ytterbium, lutetium, tin and bismuth as a co-activator, in terms of mol % relative to the metal element expressed by M. The phosphorescent marine article has an afterglow corresponding to a luminance of at least 0.3 $mCd/m^2$ for at least 1000 minutes. In a preferred embodiment of the invention the phosphorescent phosphor is incorporated into a polymer forming a phosphorescent buoy or dock post cap.

DETAILED DESCRIPTION

A marine article includes a phosphorescent phosphor. A disclosure of one example of a phosphorescent phosphor suitable for a marine product of the invention is U.S. Pat. No. 5,424,006 incorporated by reference herein. The phosphorescent marine articles described below show much longer afterglow characteristics that last longer than presently available phosphorescent marine articles and are chemically stable in the presence of moisture and UV light (marine environment).

It is important the marine article be visible throughout an entire night of darkness. This insures that marine articles are able to be seen and to alert aquatic users to dangers the marine articles are marking even in darkness. Typically the marine articles should display a visible afterglow for at least about seven-eight hours (420-480 minutes), preferably greater than about ten hours (600 minutes), more preferably greater than about 1000 minutes. This length of time is adequate for a typical summer period of darkness for most regions. However, longer afterglow periods of time are desirable.

The Phosphorescent Phosphor

One phosphorescent phosphor suitable in the invention is known commercially as "Luminova". "Luminova" is manufactured by Nemoto & Co., Ltd., of Japan. The present invention provides a phosphorescent phosphor which comprises a compound expressed by $MAl_2O_4$ whose host material is a compound in which M is at least one cation selected from a group consisting of calcium, strontium and barium.

A phosphorescent phosphor which includes a compound expressed by $MAl_2O_4$ whose host material is a compound composed of a plurality of metal cations in which M is at least one metal cation selected from a group consisting of calcium, strontium and barium to which magnesium is added.

The phosphor contains 0.001 mol % to 10 mol % of a europium activator in terms of mol % relative to the cation expressed by M. The phosphor also typically contains 0.001 mol % to 10 mol % of at least one dopant selected from a group consisting of lanthanum, cerium, praseodymium, neodymium, samarium, gadolinium, terbium, dysprosium, holmium, erbium, thulium, ytterbium, lutetium, manganese, tin and bismuth as a co-activator in terms of mol % relative to the metal element expressed by M.

The phosphorescent phosphor may show a glow peak of thermo-luminescence in a high-temperature region of 50° C. or above when irradiated by ultraviolet or visible rays having a wavelength of 200 to 450 nm at room temperatures. The phosphorescent phosphor's afterglow remains visible for at least 1000 minutes. Visible is defined as a light intensity corresponding to a luminance of about 0.3 mCd/m$^2$.

The Marine Article

Figure 1:
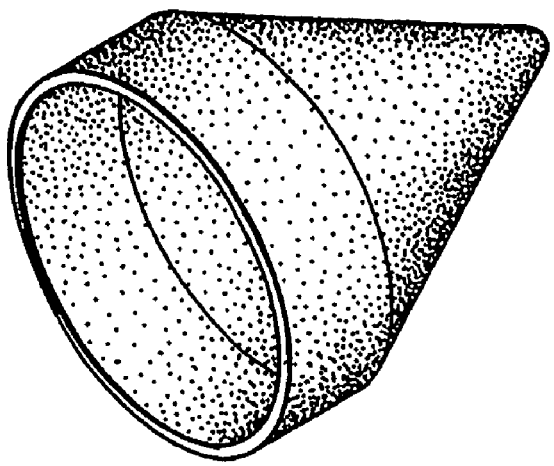
FIG. 1 is a perspective view of a marine cap.
Figure 2:
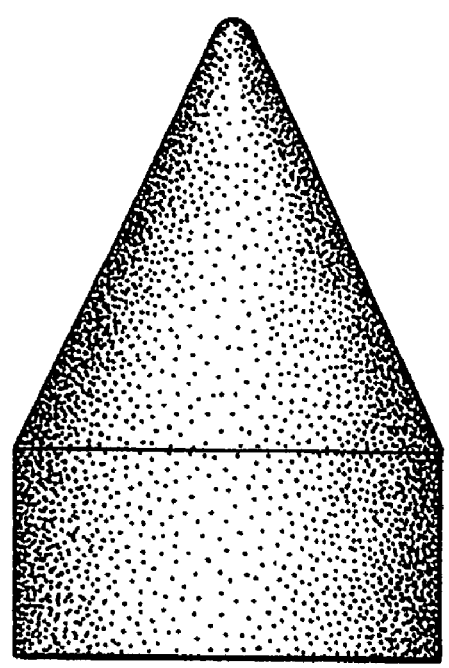
FIG. 2 is a front elevation view of a marine cap.
Figure 3:
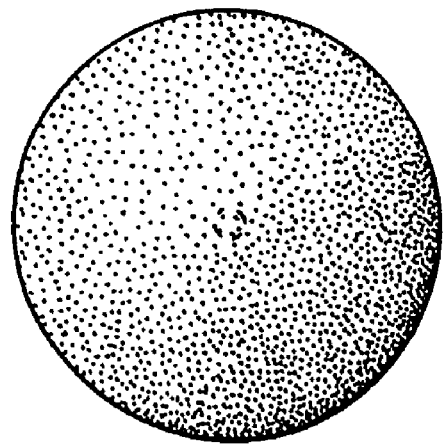
FIG. 3 is a top plane view of a marine cap.
Figure 4:
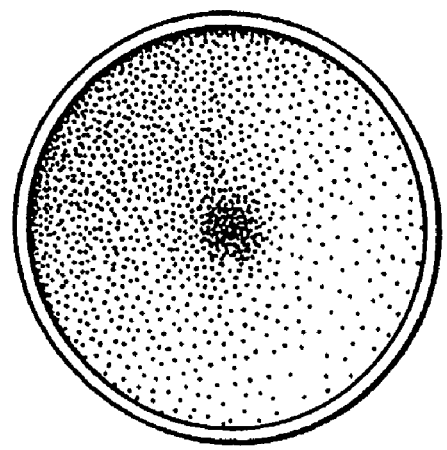
FIG. 4 is a bottom plane view of a marine cap.
Figure 5:
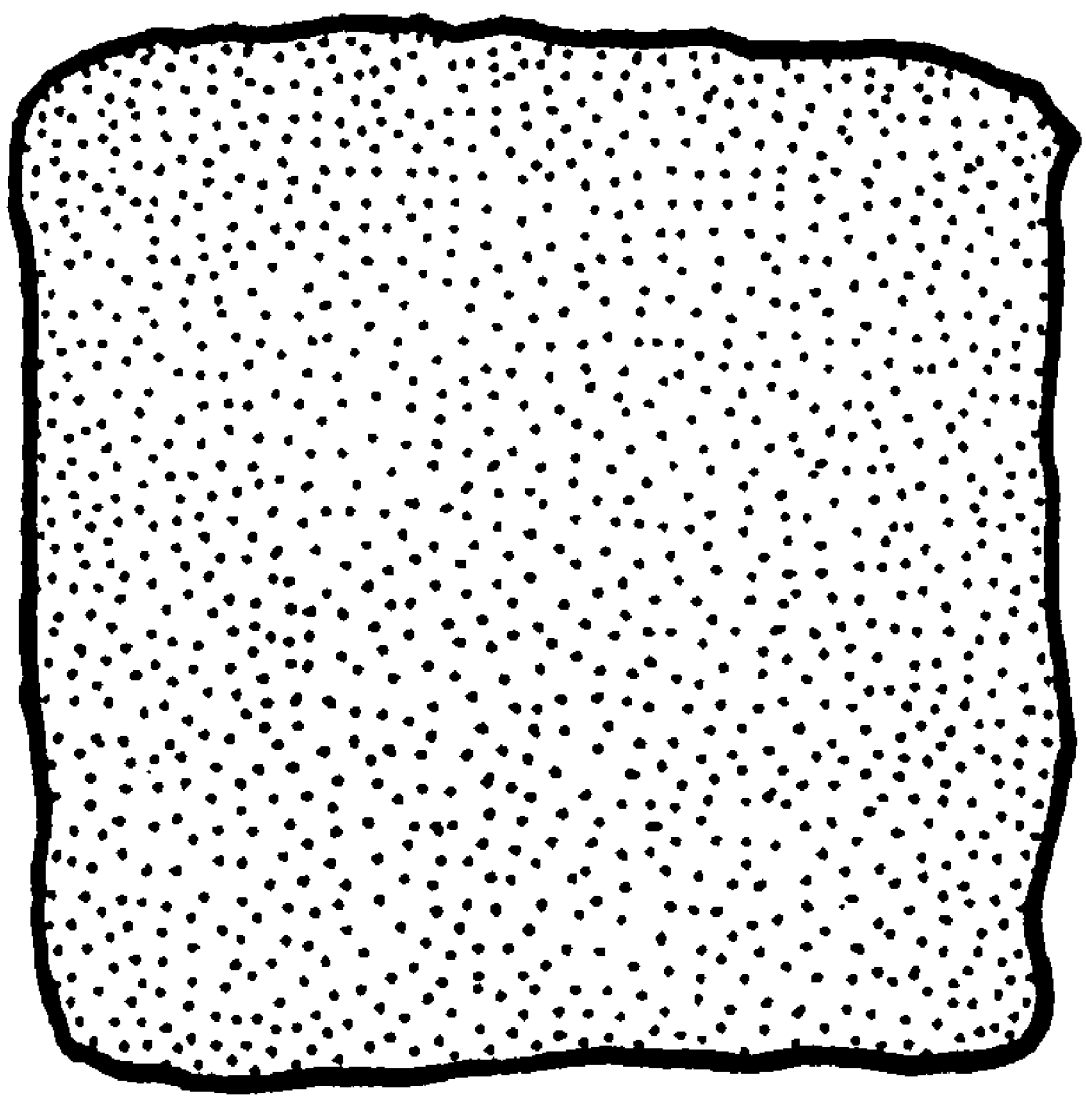
FIG. 5 represents a portion of a surface of a marine article including a phosphorescent phosphor.

The Applicants have found the above described phosphorescent phosphor useful in a variety of marine articles. Examples of marine articles include dock accessories, boat accessories, persona accessories, and flotation devices. Virtually any article that relates to outdoor water activities is useful in the invention. FIG. 5 represents a portion of the surface of a marine article including a phosphorescent phosphor according to the invention.

One particularly useful marine articles are phosphorescent marine caps. Marine caps include buoy caps and dock post caps. These marine caps can mount on top of the buoy or dock post body. FIGS. 1-4 illustrate one embodiment of a preferred configuration of a marine cap. The overall appearance of the embodiment illustrated in FIGS. 1-4 is not exhaustive of appearances which are within the scope of the invention but are merely representative of one configuration which is ornamental but maintains some or all of the functional aspects of a marine cap of the invention.

Dock Accessory

Dock accessories are articles that are used in conjunction with the construction, operation, and maintenance of a dock or pier. An listing of dock accessories includes, for example, dock fenders, post fenders, bumpers, dock trim, step trim, cleats, ladders, post caps and dock lights.

Boat Accessory

Boat accessories are articles that are used in conjunction with the construction, operation, and maintenance of a boat, ship, or personal water craft. An listing of boat accessories includes, for example, bumpers, sails, masts, lettering, numbering, marine rope, trailer guides, trailer rollers, ladders, covers, shift knobs, throttle knobs, steering wheels and instrument gauges.

Personal Accessory

Personal accessories are articles that are used in conjunction with the person while in a marine environment. An listing of personal accessories includes, for example, jackets, knives, coolers, drinking glasses, tools and patches.

Flotation Device

Flotation devices are articles that have the ability to stay on the surface of water. A listing of flotation devices includes, for example, buoys, buoy wraps, buoy caps, life jackets, floating key rings, ring buoy/life savers and floating cushions.

Tape

The phosphorescent phosphor can be incorporated into a tape. The tape can be affixed to a marine article using known methods. The tape can be a multi-layer film typically consisting of a phosphorescent backing, an adhesive and a liner.

Polymer

The phosphorescent phosphor can be incorporated into a polymer. An listing of useful polymers includes, for example, polycarbonates, polyethylenes, polypropylenes, polystyrenes, polyurethanes, copolymers of ethylene, copolymers of vinyl acetate, terpolymers of acrylonitrile, terpolymers of butadiene and terpolymers of styrene.

The manufacturing process for polymeric marine articles is typically a vacuum\thermoforming process although other methods are known in the art. The phosphorescent phosphor can be mixed with the liquid polymer to form the phosphorescent phosphor/polymer mixture. The plastic can then typically be formed into sheets. The sheets are heated and placed over a mold. A vacuum pulls the sheet around the mold to form the marine article. Finally, the article is hardened by cooling the polymer. The phosphorescent phosphor/polymer mixture may also be formed into pellets that are extruded and further processed into the marine article using known methods. Injection molding is another common process for forming the marine articles of the invention.

The phosphorescent phosphor can also be incorporated into a paint such as a polyurethane paint. The phosphorescent phosphor paint may then be applied to the marine article to provide the luminance quality using known methods.

The above specification, and figures provide a complete description of the composition of the invention. Many embodiments of the invention can be made without departing from the spirit and scope of the invention.

I claim:

1. A marine dock post cap consisting essentially of a polymer and a phosphorescent phosphor dispersed within and throughout the polymer, wherein:
    the phosphorescent phosphor comprises MAl$_2$O$_4$ wherein M is at least one cation selected from a group consisting of calcium, strontium, and barium,
    the phosphor comprises 0.001% to 10% of a europium activator, and
    the phosphor comprises 0.001% to 10% of at least one dopant selected from the group consisting of lanthanum, cerium, praseodymium, neodymium, samarium, gadolinium, dysprosium, holmium, erbium, thulium, ytterbium, lutetium, tin and bismuth as a co-activator, in terms of mol % relative to the metal element expressed by M.

2. The dock post cap of claim 1, wherein the polymer is selected from the group consisting of polycarbonate, polyethylene, polypropylene, polystyrene, polyurethane, copolymer of ethylene, copolymer of vinyl acetate, terpolymer of acrylonitrile, terpolymer of butadiene and terpolymer of styrene.

3. A marine dock post cap consisting of a polymer and a phosphorescent phosphor dispersed within and throughout the polymer, wherein:
    the phosphorescent phosphor comprises MAl$_2$O$_4$ wherein M is at least one cation selected from a group consisting of calcium, strontium, and barium,
    the phosphor comprises 0.001% to 10% of a europium activator, and
    the phosphor comprises 0.001% to 10% of at least one dopant selected from the group consisting of lanthanum, cerium, praseodymium, neodymium, samarium, gadolinium, dysprosium, holmium, erbium, thulium, ytterbium, lutetium, tin and bismuth as a co-activator, in terms of mol % relative to the metal element expressed by M.

4. The dock post cap of claim 3, wherein the polymer is selected from the group consisting of polycarbonate, polyethylene, polypropylene, polystyrene, polyurethane, copolymer of ethylene, copolymer of vinyl acetate, terpolymer of acrylonitrile, terpolymer of butadiene and terpolymer of styrene.

* * * * *